US005609970A

United States Patent [19]

Kolb et al.

[11] Patent Number: 5,609,970

[45] Date of Patent: Mar. 11, 1997

[54] ELECTROLUMINESCENT DEVICE WITH POLYMERIC CHARGE INJECTION LAYER

[75] Inventors: Eric S. Kolb, Ipswich; Parag G. Mehta, Peabody, both of Mass.

[73] Assignee: Polaroid Corporation, Cambridge, Mass.

[21] Appl. No.: 371,848

[22] Filed: Jan. 12, 1995

[51] Int. Cl.[6] .......... B32B 9/00

[52] U.S. Cl. .......... 428/690; 428/457; 428/704; 428/917; 313/504; 313/506

[58] Field of Search .......... 428/690, 917, 428/457, 704; 313/506, 504

[56] References Cited

U.S. PATENT DOCUMENTS

| | | | |
|---|---|---|---|
| 3,621,321 | 11/1971 | Williams et al. | 313/108 A |
| 4,356,429 | 10/1982 | Tang | 313/503 |
| 4,806,443 | 2/1989 | Yanus et al. | 430/56 |
| 4,818,650 | 4/1989 | Limburg et al. | 430/56 |
| 5,231,329 | 7/1993 | Nishikitani et al. | 313/503 |
| 5,281,489 | 1/1994 | Mori et al. | 428/690 |
| 5,389,444 | 2/1995 | Hosokawa et al. | 428/457 |
| 5,414,069 | 5/1995 | Cumming et al. | 528/310 |

FOREIGN PATENT DOCUMENTS

WO90/13148 11/1990 WIPO .

OTHER PUBLICATIONS

Adachi et al., Appl. Phys. Lett., 55(15), 1489–91 (1989).
Adachi et al., Appl. Phys. Lett., 56(9), 799–801 (1990).
Adachi et al., Jap. J. Appl. Phys., 27(2), L269–L271 (1988).
Chemical Abstracts, 120:311,003f (1994) (Abstract of Jap. Pat. Appn. Pubn. No. 05–271,652).
Compton et al., J. Appl. Electrochem., 18, 431–440 (1988).
Gauthier et al., Synthesis, 1987, 383.
Gustafsson et al., Nature, 357, 477–479 (1992).
Hamada et al., Jap. J. Appl. Phys., 32, L514–L515 (1993).
Leung et al., Polymer Bull., 30, 629–632 (1993).
Ohmori et al., Jap. J. Appl. Phys., 32, L1663–L1666 (1993).
Suzuki et al., Adv. Mater., 5(10), 743–746 (1993).
Tang et al., Appl. Phys. Lett., 51(12), 913–915 (1987).
Tang et al., J. Appl. Phys., 65(9), 3610–16 (1989).
Y. Ohmori et al., "Visible–Light Electroluminescent Diodes Utilitzing Poly(3–alkylthiophene)", Japanese Journal of Applied Physics, vol. 30, No. 11B, Nov. 1991, pp. L1938–L1940.
T. Fukuda et al., "The El Properties of π Conjugate Polymer Thin–Film Produced by Vacuum Vapor Deposition", Polymer Preprints, Japan, vol. 41, No. 3, (1992), p. 804 (English language translation).

*Primary Examiner*—Patrick Ryan
*Assistant Examiner*—Marie R. Yamnitzky
*Attorney, Agent, or Firm*—David J. Cole

[57] ABSTRACT

An electroluminescent device comprises first and second electrodes, a layer of an electroluminescent polymer disposed between the electrodes; and a hole injection layer disposed between the first electrode and the layer of electroluminescent polymer. The hole injection layer is formed from a polymer having a main chain and a plurality of sidechains each attached at one of its ends to the main chain, at least some of the sidechains containing an electron-donating substituent such that the oxidation potential of the polymer is less positive than about +1.6 V, and is desirably in the range of about +0.4 to about +0.8 V. Preferred electron-donating groups are di- and triphenylamino groups.

22 Claims, No Drawings

ELECTROLUMINESCENT DEVICE WITH POLYMERIC CHARGE INJECTION LAYER

BACKGROUND OF THE INVENTION

This invention relates to an electroluminescent device with a polymeric charge (hole) injection layer. More specifically, it relates to such a device in which the hole injection layer is formed from a polymer bearing electron-donating substituents. The invention also relates to a process for generating electromagnetic radiation using such a device.

In recent years, a great deal of research has been conducted into electroluminescent materials, that is to say materials which emit electromagnetic radiation (typically visible light) when an electric current flows through the material. Electroluminescent materials are potentially useful for the construction of image display devices, which could be yew thin and lightweight, and could thus advantageously replace cathode ray tubes, gas plasma displays, liquid crystal displays and other types of image display devices.

Electroluminescent devices comprise, at a minimum, a pair of electrodes with a layer of electroluminescent material sandwiched between the electrodes. Several different types of electroluminescent materials are known; see, generally as to development of such materials, International Patent Application No. PCT/GB90/00584 (Publication No. WO 90/13148). The first type to be developed was inorganic semiconductor materials such as gallium phosphide and zinc sulfide. However, such inorganic electroluminescent materials are not readily usable in large image display devices, and many of them suffer from practical drawbacks, including poor reliability. Accordingly, most recent research has concentrated on organic electroluminescent materials.

Many organic compounds, especially polycyclic arenes such as anthracene, perylene, pyrene and coronene, are electroluminescent. However, electroluminescent devices using these monomeric organic compounds suffer from poor reliability, and also present difficulties in preparing the thin layers of the materials needed for use in practical electroluminescent image display devices, and the electrodes needed for electrical contact with such layers. Techniques such as sublimation of the organic material produce layers which are soft, prone to recrystallization and unable to support high temperature deposition of electrode layers, while techniques such as Langmuir-Blodgett film deposition produce films of poor quality, dilution of the active material and high cost of fabrication. Prior art electroluminescent devices formed from these materials, such as that described in U.S. Pat. No. 3,621,321, typically suffer from high power consumption and low light output.

Attempts have also been made to use solid solutions of monomeric organic electroluminescent materials in non-electroluminescent polymers as the active layer in electroluminescent devices; see, for example, U.S. Pat. No. 4,356,429. However, use of such solid solutions carries a substantial risk of phase separation by crystallization of the electroluminescent material out of the polymer, especially in environments where the electroluminescent device may be subjected to large changes in temperature. In addition, often it is difficult to find a non-electroluminescent polymer which can dissolve a large proportion of the active electroluminescent material to form the necessary solid solution.

Accordingly, research has been carried out on electroluminescent polymers having an electroluminescent group incorporated into the polymer itself However, electroluminescent devices based upon such polymers tend to require high operating voltages and accordingly may have relatively low electroluminescent efficiencies. The operating voltages of such electroluminescent devices can be lowered by reducing the thickness of the electroluminescent polymer layer, but if one attempts to reduce this thickness to about 0.1 μm, defects (so-called "pinholes") appear in the electroluminescent layer and act as shorts between the electrodes, thus destroying the electroluminescent properties of the device. To allow the use of thin electroluminescent layers without the formation of pinholes or other defects, it is known to provide electroluminescent devices with a hole injection layer between the anode and the electroluminescent material and/or an electron injection layer between the cathode and the electroluminescent material. For example, U.S. Pat. No. 4,356,429 to Tang describes an electroluminescent device having a metal porphyrin as a hole injection layer and a tetraphenylbutadiene/polystyrene electroluminescent layer. Similarly, Adachi et al., Jap. J. Appl. Phys., 27(2), L269-L271 (1988) describe an electroluminescent device having an electroluminescent layer formed from a polycyclic hydrocarbon, a hole injection layer formed from an aromatic diamine and a electron injection layer formed from a perylene tetracarboxylic acid derivative.

Ito et al, in Chemical Abstracts 120:311,003f (1994) (Abstract of Japanese Pat. Application Publication No. 05-271,652, published Oct. 19, 1993) describe an electroluminescent device having a hole injection layer formed from a cross-linked polymer containing triphenylamine groups. The device is stated to shown good heat resistance and transparency. However, the cross-linked polymeric hole injection layer described by Ito is inconvenient to prepare. Conventionally, each layer of an electroluminescent device is formed by dissolving the material used to form the layer in a solvent, applying a thin film of the resulting solution on to a substrate by spin coating or a similar technique, and drying the coated substrate to remove the solvent and form the desired thin layer. It is not possible to apply the Ito et al. cross-linked polymer in this manner, since in its cross-linked form the polymer is virtually insoluble in all common solvents. Accordingly, the Ito et al. hole injection layer must be prepared by coating the appropriate monomer from solution, drying to form a layer of the monomer and then polymerizing the monomer in situ to form the cross-linked polymer. Such in situ polymerization is in practice inconvenient since it requires the use of additional equipment often not readily available at locations where electroluminescent devices are prepared, and moving the coated substrate to appropriate apparatus may result in contamination of the coated substrate, with possible damage to the integrity of the thin layers.

The present invention provides an electroluminescent device provided with a hole injection layer which possesses advantages similar to those of the Ito et al. hole injection layer but which can be applied without the disadvantages associated with in situ polymerization.

SUMMARY OF THE INVENTION

Accordingly, this invention provides a process for generating electromagnetic radiation. This process comprises providing first and second electrodes; providing a layer of an electroluminescent polymer disposed between the first and second electrodes; providing, between the first electrode and the layer of electroluminescent polymer, a hole injection layer, the hole injection layer comprising a polymer having a main chain and a plurality of sidechains each attached at one of its ends to the main chain, at least one of the sidechains containing an electron-donating substituent such that the oxidation potential of the polymer is less positive than about +1.6 V; and applying a potential difference between the first and second electrodes sufficient to cause current to flow from the first electrode to the second electrode and electromagnetic radiation to be emitted from the layer of electroluminescent polymer.

References herein to current flow (for example, flow from the first to the second electrode) are to the conventional current, regarded as flowing from an anode to a cathode, and not to the actual electron flow.

References herein to oxidation potentials of polymers are to oxidation potential determined by cyclic voltammetry in the following manner. A polymer film is formed on an electrode (preferably 10 ohm indium-tin oxide (ITO) coated glass using the same method employed to produce the electroluminescent device; spin coating is preferred, although other techniques, for example dip coating, may be used if desired. The electrolysis of the polymer-coated electrode is carried out in acetonitrile 0.100M in tetrabutyammonium tetrafluoroborate (TBATFB). The auxiliary electrode is a platinum wire, while the reference electrode is a silver/silver nitrate electrode comprising a silver wire in acetonitrile 0.010M in silver nitrate and 0.100M in TBATFB. The electrolysis is run at room temperature (21° C.).

This invention also provides an electroluminescent device comprising first and second electrodes; a layer of an electroluminescent polymer disposed between the first and second electrodes; and a hole injection layer disposed between the first electrode and the layer of electroluminescent polymer, the hole injection layer comprising a polymer having a main chain and a plurality of sidechains each attached at one of its ends to the main chain, at least one of the sidechains containing an electron-donating such that the ionization potential of the polymer is less positive than about +1.6 V.

DETAILED DESCRIPTION OF THE INVENTION

As already mentioned, the electroluminescent device of the present invention uses a hole injection layer formed from a polymer having a main chain and a plurality of sidechains each attached at one of its ends to the main chain, at least one of the sidechains containing an electron-donating such that the oxidation potential of the polymer (determined in manner described above) is less positive than about +1.6 V, and preferably within the range of about +0.4 to about +0.8 V. Unlike the Ito et al. cross-linked polymers, the polymers used in the present devices can, typically, be dissolved in common organic solvents and accordingly the hole injection layers can be formed using conventional solvent-application techniques, without a need for in situ polymerization, as demonstrated in the Example below.

Although other electron-donating groups may be employed in the hole injection polymer (for example, dialkylamino), desirably at least some and preferably all of the electron-donating groups are diphenylamino or triphenylamino groups. Preferred groups are diphenylaminobiphenyl, diphenylaminobiphenyl, N-methyl-N-phenylaminobiphenyl or N-ethyl-N-phenylaminobipiphenyl groups.

In the hole injection polymer, the electron-donating groups may be directly attached to the main chain, so that the electron-donating groups form the whole of the sidechains of the polymer. However, it is generally preferred that each of the sidechains comprise a spacer group disposed between the electron-donating group and the main chain, this spacer group allowing the electron-donating group to move relative to and independently of the main chain. The spacer group may be, for example, a methylene group, a polymethylene group, or an ether, ester, urea, siloxane, urethane, imide or amide linkage.

The nature of the main chain in the hole injection polymer is not critical and a wide variety of main chains may be employed, provided of course that they do not contain any groups which would interfere with the electron-donating function of the pendant groups responsible for the hole injection function of the polymer. The main chain may be, for example, a polymethylene, poly(alkylmethylene), polyether, poly(alk)acrylate, polyurethane, polyimide, polyamide, polyurea, polyester, polyether ketone, poly(N-acylimine) or polysiloxane chain.

Two specific preferred hole injection polymers for use in the present process are poly[2-[[[(4'-diphenylaminobiphenyl-4-amino)carbonyl]amino]ethoxy-carbonyl]propylene], derived from the monomer of the formula:

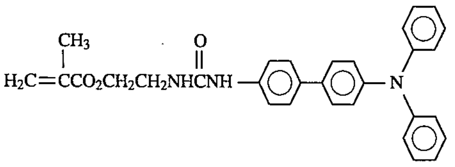

and poly[2-[[(4'-diphenylaminophenyl-4-carbonyl)amino]ethoxycarbonyl]propylene, derived from the monomer of the formula:

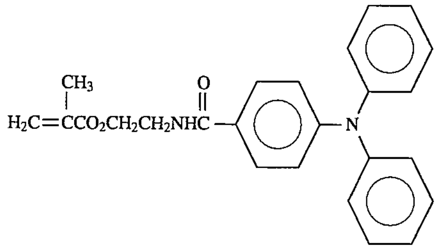

Poly[2-[[[(4'-diphenylaminobiphenyl-4-amino)carbonyl]amino]ethoxycarbonyl]propylene] can be prepared by an Ullmann coupling reaction between 4-iodo-4'-nitrobiphenyl and diphenylamine (see Gauthier et al., Synthesis, 1987, 383) to give 4'-nitro(4'-N,N-diphenyl)biphenylamine, which is converted by catalytic hydrogenation with 10% palladium on charcoal in tetrahydrofuran at room temperature to 4-amino(4'-N,N-diphenyl)biphenylamine. The amino compound can then be condensed directly with isocyanatoethyl methacrylate in tetrahydrofuran to yield the crude desired monomer, which may be purified by column chromatography.

Polymerization is conveniently effected using a 10% by weight solution of the monomer in tetrahydrofuran under argon, adding azobis(isobutyronitrile) (AIBN) as a radical initiator and polymerizing for 48 hours at 60° C. The polymer is precipitated upon pouring the reaction mixture into methanol.

Any known electroluminescent material (including vapor deposited films) may be used in the electroluminescent layer of the present devices. Good results have been obtained in the present devices using poly[methyl 2-(1-pyrenyl)ethyl siloxane] (prepared as described in U.S. Pat. No. 5,414,069, and assigned to the same assignee as the present application) and polythiophene electroluminescent layers. When a polythiophene electroluminescent layer is employed, it is preferably one having a high head-to-tail ratio, as described and claimed in copending application Ser. No. 08/111,657, filed Aug. 25, 1993 and assigned to the same assignee as the present application.

The devices of the present invention may comprise an electron injection layer disposed between the layer of electroluminescent polymer and the second electrode. Materials suitable for use in such electron injection layers will be well known to those skilled in the art of fabricating electroluminescent devices.

As already mentioned, the polymers used in the present devices and processes can be dissolved in common organic solvents, for example toluene, and thus the hole injection layers can be formed using conventional apparatus and coating techniques such as spin coating. The thickness of the hole injection layer can vary widely, but is preferably in the range of about 30 to about 500 nm.

The following Examples are now given, though by way of illustration only, to show details of preferred reagents, conditions and techniques used in the devices and processes of the present invention.

EXAMPLE

An electroluminescent device (Device A) of the present invention was prepared using an anode (first electrode) of indium tin oxide (ITO) coated glass; such coated glass is available from PPG Industries, Inc., Pittsburgh, Pa. under the trademarks Nesa and Nesatron, and has a resistance of about 100 ohm $cm^{-2}$ and a transmittance of about 80 percent for visible light. The coated glass was washed using a detergent both in an ultra-sonicator for at least 30 minutes, then thoroughly rinsed with distilled water and dried, either in an oven at 110° C. for 2 hours or in the vapors of refluxing isopropanol for 30 minutes, and stored in a nitrogen-filled glove bag before use. The ITO anodes were rinsed with 9:1 tetrahydrofuran/cyclopentanone and immediately spin coated with a 1 percent solution of poly[2-[[[(4'-diphenylaminobiphenyl-4-amino)-carbonyl]amino]ethoxycarbonyl] propylene] in 9:1 tetrahydrofuran/cyclopentanone. After coating, the polymer film was dried in a nitrogen-purged oven for 1 hour at 60°–70° C. to form the hole injection layer. An electroluminescent layer formed from either poly [methyl 2-(1-pyrenyl)ethyl siloxane] was then deposited on top of the hole injection layer by spin coating. After coating, the anodes were dried in a nitrogen-purged oven for 1 hour at about 65° C. to form the electroluminescent. To complete the electroluminescent devices, aluminum electrodes were vapor deposited on top of the electroluminescent polymer.

A control device (Device B) was prepared in the same manner as Device A except that the hole injection layer was omitted.

Another electroluminescent device (Device C) of the present invention was prepared in the same manner as Device A except that the hole injection layer was formed from poly[2-[[(4'-diphenylaminophenyl-4-carbonyl)-amino] ethoxy-carbonyl]propylene and the cathode was formed from magnesium/aluminum. Finally, a control device (Device D) was prepared in the same manner as Device C except that the hole injection layer was omitted.

The electroluminescent properties of the four devices thus produced were then tested using an apparatus which permitted variation of the voltage applied across the device and recording of the current passing through the device. The light emitted from the device fell on a calibrated photodetector having known sensitivity/wavelength properties. The results obtained are shown in the Table below. In this Table, the slope efficiency (in arbitrary units) is a measure of the rate of change of detector current versus the current passing through the device at the operating voltage (and is thus proportional to the electro-luminescent efficiency of the device), and brightness is a measure of the maximum electroluminescent output obtainable from the device.

TABLE

| Device | Slope efficiency | Photodetector current (μA) @ Device current (mA) | Internal Efficiency (%) | Brightness (Cd $m^{-2}$) |
|---|---|---|---|---|
| A | $470 \times 10^{-6}$ | 11.9 @ 27 | 0.206 | 168 |
| B (Control) | $6.0 \times 10^{-6}$ | 286 @ 50 | 0.0026 | 4.0 |
| C | $122 \times 10^{-6}$ | 2.2 @ 18 | 0.056 | 35 |
| D (Control) | $13.9 \times 10^{-6}$ | 695 @ 50 | 0.0064 | 10 |

From the data in the Table above, it will be seen that inclusion of the hole injection polymer layer having electron-donating groups in accordance with the present invention produced substantial (at least 3 fold) increases in light output, with approximately an order of magnitude increase in internal efficiency. It was also observed that the devices of the present invention displayed greater stability (as measured by the number of cycles in which the current could be increased from zero to a predetermined value and then dropped back to zero) than the control devices.

As demonstrated above, the present invention provides an electroluminescent device and process which allows a hole injection layer to be provided using conventional polymer deposition techniques without the requirement for special equipment, but with substantial improvements in the electroluminescent efficiency and light output, as compared with similar devices and processes which lack the hole injection layer of the present invention.

We claim:

1. A process for generating electromagnetic radiation, which process comprises:

providing first and second electrodes;

providing a layer of an electroluminescent polymer disposed between the first and second electrodes;

providing, between the first electrode and the layer of electro-luminescent polymer, a hole injection layer, the hole injection layer comprising a polymer having a main chain and a plurality of sidechains each attached at one of its ends to the main chain, at least one of the sidechains containing an electron-donating group such that the oxidation potential of the polymer is less positive than about +1.6 V; and applying a potential difference between the first and second electrodes sufficient to cause current to flow from the first electrode to the second electrode and electromagnetic radiation to be emitted from the layer of electroluminescent polymer, the layer of electroluminescent polymer being free from any polymer having a main chain and a plurality of sidechains each attached at one of its ends to the main chain, wherein at least one of the sidechains contains an electron-donating group such that the oxidation potential of the excluded polymer is less positive than about +1.6 V.

2. A process according to claim 1 wherein the oxidation potential of the polymer is in the range of about +0.4 to about +0.8 V.

3. A process according to claim 1 wherein at least some of the electron-donating groups in the polymer are diphenylamino or triphenylamino groups.

4. A process according to claim 3 wherein all of the electron-donating groups in the polymer are diphenylamino or triphenylamino groups.

5. A process according to claim 3 wherein at least some of the electron-donating groups in the polymer are diphenylaminobiphenyl, diphenylaminophenyl, N-methyl-N-phenylaminobiphenyl or N-ethyl-N-phenylaminobiphenyl groups.

6. A process according to claim 3 wherein the main chain comprises a polymethylene, poly(alkylmethylene), polyether, poly(alk)acrylate, polyurethane, polyimide, polyamide, polyurea, polyester, polyether ketone, poly(N-acylimine) or polysiloxane chain.

7. A process according to claim 1 wherein each of the sidechains further comprises a spacer group disposed between the electron-donating group and the main chain, the spacer group allowing the electron-donating group to move relative to the main chain.

8. A process according to claim 6 wherein each of the spacer groups comprises a methylene group, a polymethylene group, or an ether, ester, urea, urethane, siloxane, imide or amide linkage.

9. A process according to claim 1 wherein the electroluminescent polymer comprises a poly(siloxane-pyrene) or polythiophene.

10. A process according to claim 1 wherein an electron injection layer is disposed between the layer of electroluminescent polymer and the second electrode.

11. A process according to claim 1 wherein the hole injection layer comprises poly[2-[[[(4'-diphenylaminobiphenyl-4-amino)carbonyl]amino]ethoxycarbonyl]propylene] or poly[2-[[(4'-diphenylaminophenyl-4-carbonyl)amino] ethoxycarbonyl]propylene.

12. An electroluminescent device comprising:

first and second electrodes;

a layer of an electroluminescent polymer disposed between the first and second electrodes; and a hole injection layer disposed between the first electrode and the layer of electroluminescent polymer, the hole injection layer comprising a polymer having a main chain and a plurality of sidechains each attached at one of its ends to the main chain, at least one of the sidechains containing an electron-donating group such that the oxidation potential of the polymer is less positive than about +1.6 V, the layer of electroluminescent polymer being free from any polymer having a main chain and a plurality of sidechains each attached at one of its ends to the main chain, wherein at least one of the sidechains contains an electron-donating group such that the oxidation potential of the excluded polymer is less positive than about +1.6 V.

13. An electroluminescent device according to claim 12 wherein the oxidation potential of the polymer is in the range of about +0.4 to about +0.8 V.

14. A device according to claim 12 wherein at least some of the electron-donating groups in the polymer are diphenylamino or triphenylamino groups.

15. A device according to claim 14 wherein all of the electron-donating groups in the polymer are diphenylamino or triphenylamino groups.

16. A device according to claim 14 wherein at least some of the electron-donating groups in the polymer are diphenylaminobiphenyl, diphenylaminophenyl, N-methyl-N-phenylaminobiphenyl or N-ethyl-N-phenylaminobiphenyl groups.

17. A device according to claim 14 wherein the main chain comprises a polymethylene, poly(alkylmethylene), polyether, poly(alk)acrylate, polyurethane, polyimide, polyamide, polyurea, polyester, polyether ketone, poly(N-acylimine) or polysiloxane chain.

18. A device according to claim 12 wherein each of the sidechains further comprises a spacer group disposed between the electron-donating group and the main chain, the spacer group allowing the electron-donating group to move relative to the main chain.

19. A device according to claim 18 wherein each of the spacer groups comprises a methylene group, a polymethylene group, or an ether, ester, urea, urethane, siloxane, imide or amide linkage.

20. A device according to claim 12 wherein the electroluminescent polymer comprises a poly(siloxane-pyrene) or polythiophene.

21. A device according to claim 12 wherein an electron injection layer is disposed between the layer of electroluminescent polymer and the second electrode.

22. A device according to claim 12 wherein the hole injection layer comprises poly[2-[[[(4'-diphenylaminobiphenyl-4-amino)carbonyl]amino]ethoxycarbonyl]propylene] or poly[2-[[(4'-diphenylaminophenyl-4-carbonyl)amino] ethoxycarbonyl]propylene.

* * * * *